United States Patent

[11] 3,575,647

| | | | |
|---|---|---|---|
| [72] | Inventor | Kenneth Levy | |
| | | Binghamton, N.Y. | |
| [21] | Appl. No. | 760,113 | |
| [22] | Filed | Sept. 5, 1968 | |
| [45] | Patented | Apr. 20, 1971 | |
| [73] | Assignee | Singer-General Precision, Inc., | |

[54] PLURAL MOTOR SERVO DRIVE SYSTEM INCLUDING MECHANICAL DIFFERENTIAL SUMMATION AND TORQUE COMPENSATION
5 Claims, 13 Drawing Figs.

[52] U.S. Cl. .................................................. 318/8,
318/625, 318/639, 318/632
[51] Int. Cl. ..................................................... H02p 7/68
[50] Field of Search ........................................... 318/8, 19,
20.450, 20.602

[56] References Cited
UNITED STATES PATENTS

| | | | |
|---|---|---|---|
| 2,796,565 | 6/1957 | Walcott, Jr. .................... | 318/8 |
| 2,801,380 | 7/1957 | Wellington, Jr. ............... | 318/8X |

Primary Examiner—T. E. Lynch
Attorney—Francis L. Masselle

ABSTRACT: The disclosed embodiment of this invention is a servosystem for controlling the rotational position of a pair of anamorphic lenses in a perspective alteration optical system. A first servomechanism is connected to directly drive one of the anamorphic lenses and also to directly drive one input shaft of a differential coupling. A second servomechanism is connected to a second input shaft of the differential coupling. The other anamorphic lens is connected to and driven directly from the output shaft of the differential coupling. A signal proportional to the torque produced by the first servomechanism is supplied to the second servomechanism such that positional errors resulting from the inherent compliance of the second servomechanism are eliminated.

KENNETH LEVY
INVENTOR

BY Andrew G. Pullon
HIS ATTORNEY

KENNETH LEVY
INVENTOR

KENNETH LEVY
INVENTOR

3,575,647

KENNETH LEVY
INVENTOR

BY
HIS ATTORNEY

KENNETH LEVY
INVENTOR

HIS ATTORNEY

KENNETH LEVY
INVENTOR.

PLURAL MOTOR SERVO DRIVE SYSTEM INCLUDING MECHANICAL DIFFERENTIAL SUMMATION AND TORQUE COMPENSATION

This invention relates generally to a feed forward control method and apparatus and more particularly to a novel method of and apparatus for correcting an error at an output of a differential coupling having the inputs thereof connected to respective servomechanisms. The present invention has particular application in the use of a pair of servomechanisms each connected to a respective input shaft of a differential coupling, wherein at least one of the servomechanisms has an inherent compliance which results in a positional error at the output of the coupling.

If it is desired to position an element in accordance with a relationship having two variables, a differential coupling may be employed with positioning means, such as servomechanisms, for driving each of the input shafts of the coupling in accordance with each of the variables. If the element to be positioned is connected to an output shaft of the differential coupling, its position can be altered by displacing or rotating one or both of the inputs of the differential coupling. If one of the servomechanisms, which is connected to position one input shaft of the coupling, has an inherent compliance, a torque supplied by the servomechanism to position the other input shaft will cause an error in the rotational position of the output shaft. This error will be proportional to the amount of inherent compliance in the servomechanism. The positional error at the output of the differential coupling is a result of the inability of the coupling to transmit all the torque from one input thereof to the output resulting in a portion of that torque being transmitted to the other input of the coupling.

An error must occur at an output of a servomechanism before a feedback error signal is developed which is proportional to the error. The error signal is then fed back to an input of the servomechanism to produce a counteracting torque which will tend to offset the positional change produced by the error.

Because of the fact that the error must occur before any compensation can be made, a lag exists which is normally referred to as the "compliance" or "figure of merit" of the servomechanism. Since the torque supplied to a first input of a differential coupling is reflected to the second input thereof, an error will occur at the output of the servomechanism which is connected to the second input. Because of the inherent compliance of the servomechanism, that error created by the reflected torque cannot be completely eliminated or offset by the feedback error signal. Since the output of the differential coupling is equal to the sum of the two inputs, the uncompensated error which exists at one of the inputs will be realized as an error in the position of the output of the differential coupling.

In a particular type of optical system for altering the apparent perspective of an image, a pair of anamorphic lenses are employed which must be positioned in accordance with a predetermined relationship, wherein the position of one of the lenses is defined in accordance with that relationship with respect to the position of the other lens. Such an optical system is described in U.S. Pat. No. 3,015,988. In order to position the anamorphic lenses of such a system, a pair of servomechanisms and a differential coupling may be employed in an arrangement similar to that described hereinabove. One of the lenses is connected in tandem with an output of one of the servomechanisms and an input shaft of the differential coupling. The second lens element is connected to an output of the differential coupling, such that its position can be determined from the position of the first lens which is connected to a first input of the differential coupling, as well as the position of the second input of the differential coupling.

In the type of image alteration optical system described in U.S. Pat. No. 3,015,988, a point exists in the position of the two anamorphic lenses at which the position of one of the anamorphic lenses in undefined with respect to a reference. This point occurs at a position of the anamorphic lenses wherein the axis of magnification of the lenses are orthogonal to one another. When the axis of magnification of two anamorphic lenses each having the same power of magnification are orthogonal to one another, the combination is the equivalent of a spherical lens with respect to the light passing therethrough. Consequently, when the axis of magnification of two anamorphic lenses are orthogonally disposed with respect to one another, the simultaneous rotation of both lenses, while maintaining the orthogonal relationship of the magnification axes, will not alter or distort an image which is being transmitted therethrough.

In an optical system which employs anamorphic lenses for altering the apparent perspective of an image, it may be necessary to view the image without any distortion. Since the combination of a pair of anamorphic lenses having their magnification axes orthogonal to one another is the equivalent of a spherical lens, the relative position of one lens with respect to the other lens must be maintained constant, but a change in the relative position of both lenses with respect to a reference will not distort the image. Consequently, if the angular position of one lens is defined with respect to the angular position of the other lens, the angular position of the other lens will be undefined with respect to a reference when the magnification axis of the two lenses are orthogonal to one another.

If such an optical system is employed as a visual system of a simulated vehicle or the like, a motion picture film is employed which includes a plurality of scenes photographed along a typical vehicular path of the simulated vehicle. An optical system for altering apparent perspective of the images of those scenes is employed for simulating a departure from the vehicular path described by the scenes recorded on the motion picture film. The optical system for altering the apparent perspective of the images of those scenes is controlled from various computed quantities derived from the controls which are operated by the student using the simulated vehicle. If the student operates the controls of the simulated vehicle such that the simulated vehicle follows the identical path which was followed by the vehicle carrying the camera which photographed the motion picture film, the two anamorphic lenses of that optical system for displaying the scenes to the student will not produce any distortion of the resultant image. As mentioned hereinabove, the position of one of the anamorphic lenses is undefined with respect to a reference when no distortion is produced in the image by the optical system.

Since the optical system is controlled in accordance with a plurality of computed quantities which are generated in accordance with the controls of the simulated vehicle, a signal must be developed which is indicative of the position of each of the anamorphic lenses. However, if the position of one of the anamorphic lenses is undefined, the computed quantity in the form of a control signal can be any value within a prescribed range if the position of that lens is undefined. Under such conditions, extremely high accelerations may be produced in the angular displacement of the anamorphic lens. If the angular position of the other anamorphic is defined with respect to the angular position of the first anamorphic lens, the above described differential coupling and associated servomechanisms may be employed for controlling the position of both lenses. The high accelerations which may be developed in the motion of the first anamorphic lens will cause an error in the position of the second anamorphic lens due to the inherent compliance in the servomechanism.

If the simulated vehicle is being operated in a manner which requires visual simulation of a particular scene as viewed from a point which is spaced from the viewpoint of the recorded scene and an excursion is made through the viewpoint of the recorded scene to another viewpoint, extremely high accelerations may be required of the anamorphic lens whose position is undefined with respect to a reference at the point where the image is undistorted, which is the viewpoint of the recorded scene. For instance, if the scene is to be viewed from a point to the left of the viewpoint of the recorded scene and an excursion is made directly toward the viewpoint of the recorded scene and an abrupt change is made at such viewpoint in the excursion, the rotational position of the anamorphic lens, which position is undefined when the viewpoint of the simulated scene is at the viewpoint of the recorded scene, will require a large change while the visual excursion passes through that viewpoint. Consequently, large accelerations of that lens will be required which will result in an error in the position of the other anamorphic lens due to the inherent compliance in the servomechanism associated therewith.

Accordingly, it is an object of the present invention to provide a servo drive system for positioning an element in accordance with at least two variable.

It is another object of the present invention to provide a servo drive system for positioning an element in accordance with two variables with a pair of servomechanisms connected to respective inputs of a differential coupling, such that the inherent compliance of the servomechanisms does not produce an error in the position of the controlled element.

Still another object of the present invention is to provide a servo drive system for a pair of anamorphic lenses in an image distortion optical system wherein the position of one of the anamorphic lenses is undefined with respect to a reference and wherein the position of the second anamorphic lens is maintained fixed with respect to the first anamorphic lens.

These and other objects of the present invention are attained by the provision of a pair of servomechanisms connected to a respective input of a differential coupling having the output thereof connected to the element to be controlled and by the provision of a feed forward control loop which senses the torque developed by one of the servomechanisms for controlling the torque developed by the other of the servomechanisms.

These and other objects, features and advantages of the present invention will be more fully realized and understood from the following detailed description when taken in conjunction with the accompanying drawings within:

Figure 3:
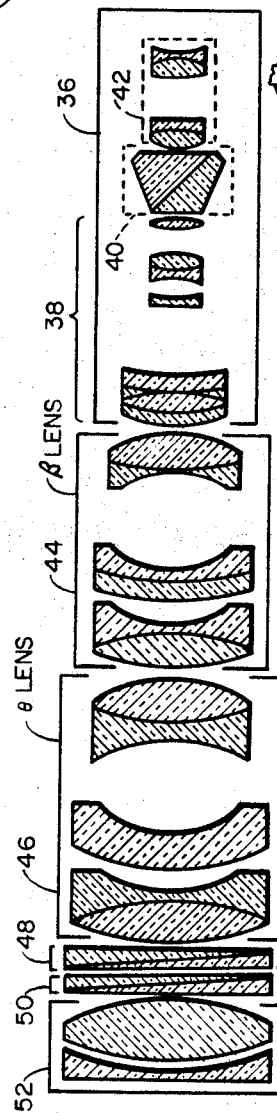
FIG. 3 is a diagrammatic illustration of the optical system employed in the visual system illustrated in FIG. 2.
Figure 6A:
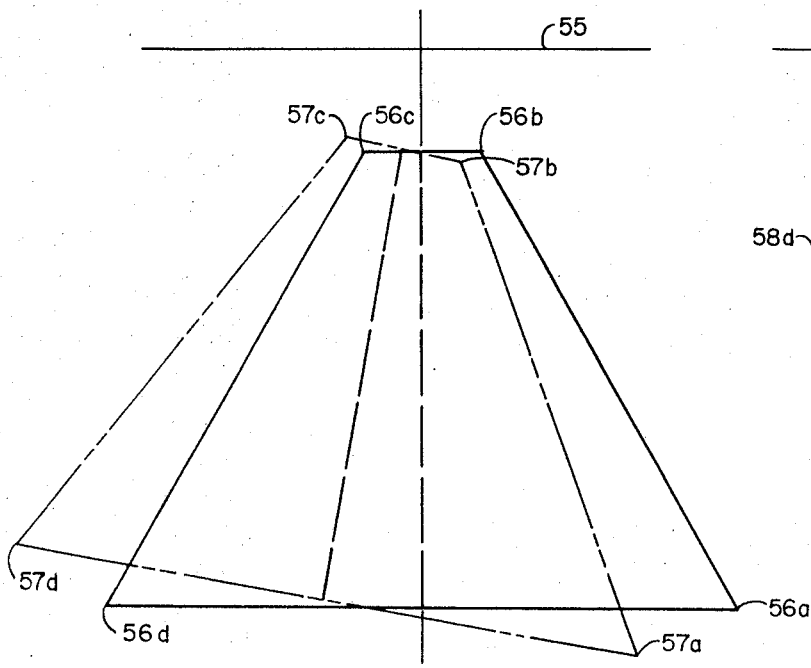
Figure 6B:
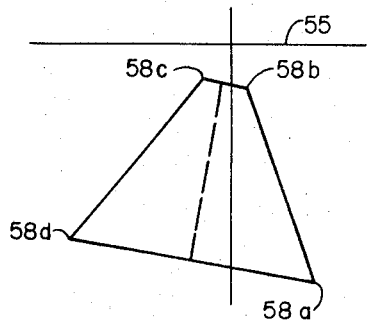
Figure 7:
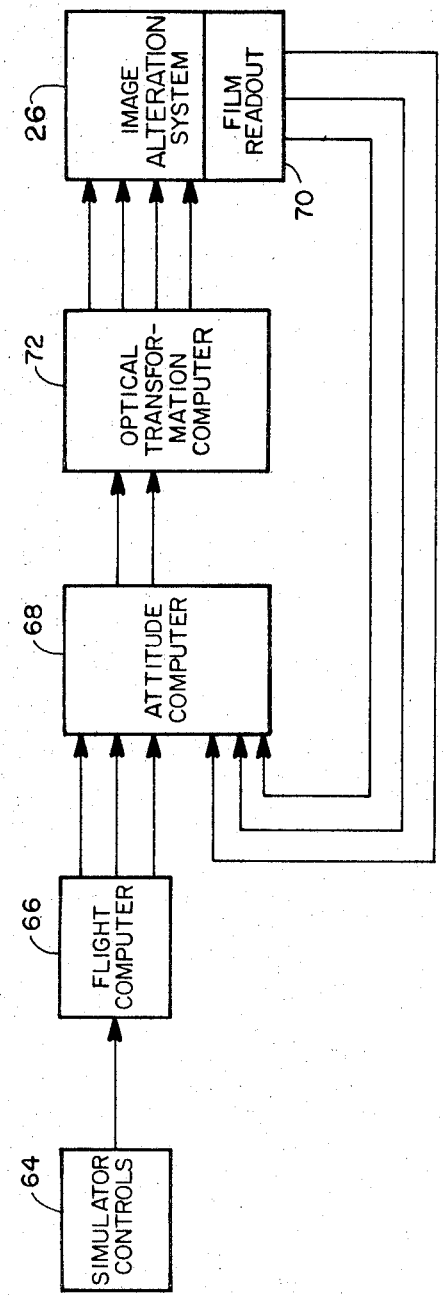
Figure 9:
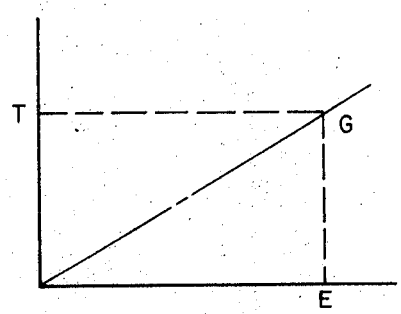
Figure 8:
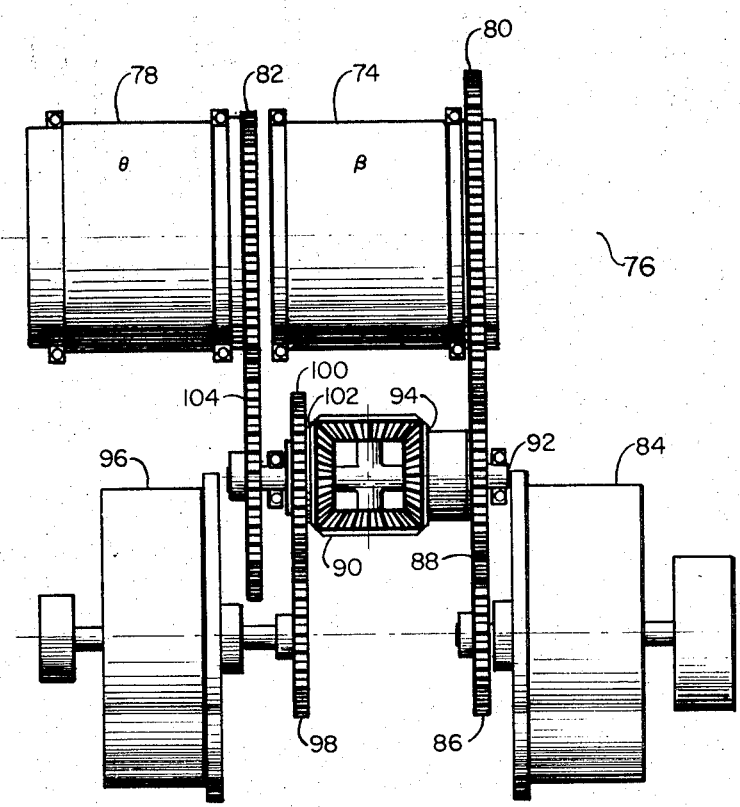
Figure 10:
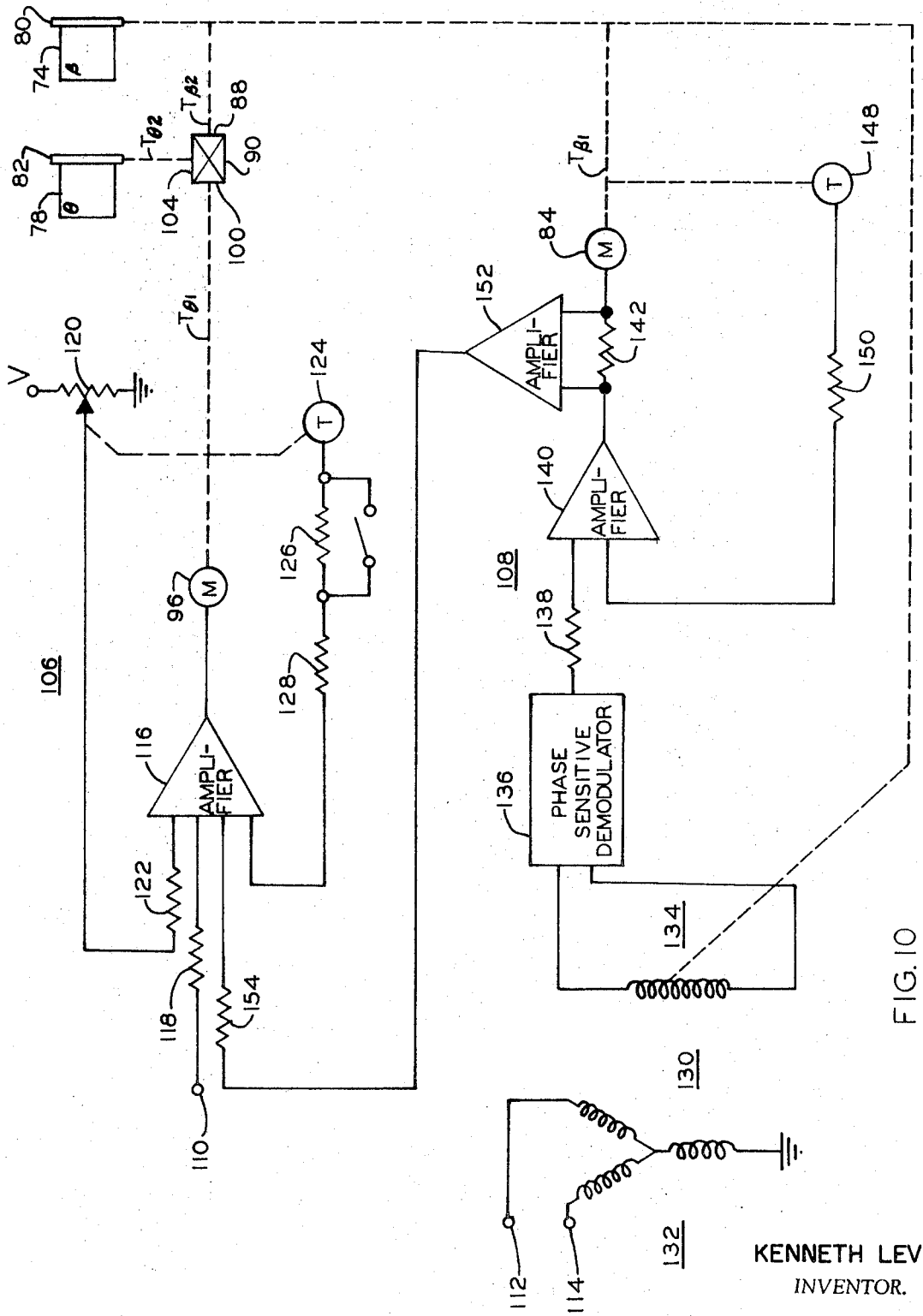

FIG. 6a, 6b, c and 6d are diagrammatic representations of the transformation of an image projected through the optical system illustrated in FIG. 3 when the elements thereof are positioned in accordance with a predetermined relationship;

FIG. 7 is a block diagram of a control system for positioning the elements of the optical system illustrated in FIG. 3;

FIG. 8 is a view in elevation of the system for angularly displacing two of the optical elements;

FIG. 9 is a graph of the relationship between the applied torque of a servomechanism and the resultant error therein; and FIG. 10 is a schematic diagram of a circuit constructed in accordance with and embodying the principals of the present invention.

Like reference numerals throughout the various views of the drawings are intended to designate the same or similar structures.

Figure 1:
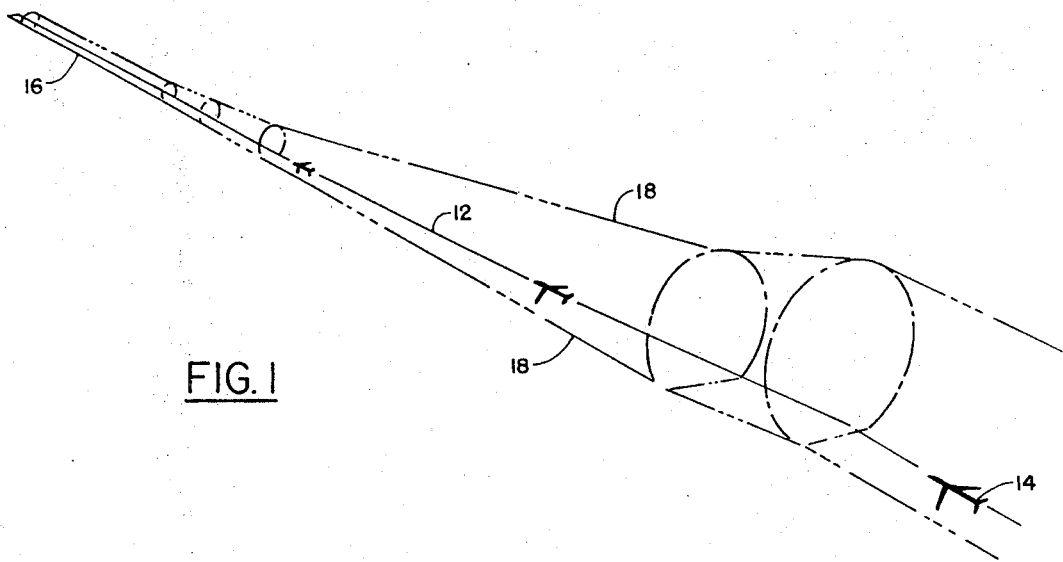
FIG. 1 is a diagrammatic view of the flight path of a camera airplane and the associated envelope defining the maximum excursions of a visual system in a simulated airplane which simulates the same flight.

With reference to FIG. 1, there is shown a flight path 12 of an airplane 14 making an approach to a landing strip 16. If it is desired to visually simulate the approach of the airplane 14 with respect to the landing strip 16, a motion picture camera (not shown) is mounted on the airplane 14 and a plurality of scenes are recorded approximately at the rate of 24 frames per second. The developed motion picture film is then employed with a grounded airplane simulator, such as the type illustrated in FIG. 2, to provide a motion picture presentation of scenes as viewed from the airplane 14 proceeding along the flight path 12. However, since a student pilot cannot effectively follow the identical flight path 12, the visual system for displaying the motion picture presentation must be capable of distorting the image to simulate excursions from the flight path 12.

The optical system for altering the apparent perspective of an image, which is described in U.S. Pat. No. 3,015,988, permits excursions of the simulated aircraft from the flight path 12 to the limits shown by the phantom lines designated with the reference numeral 18. The lines 18, therefore, define the envelope of the perspective alteration capabilities of the optical system employed in conjunction with the motion picture projector on the aircraft simulator.

Figure 2:
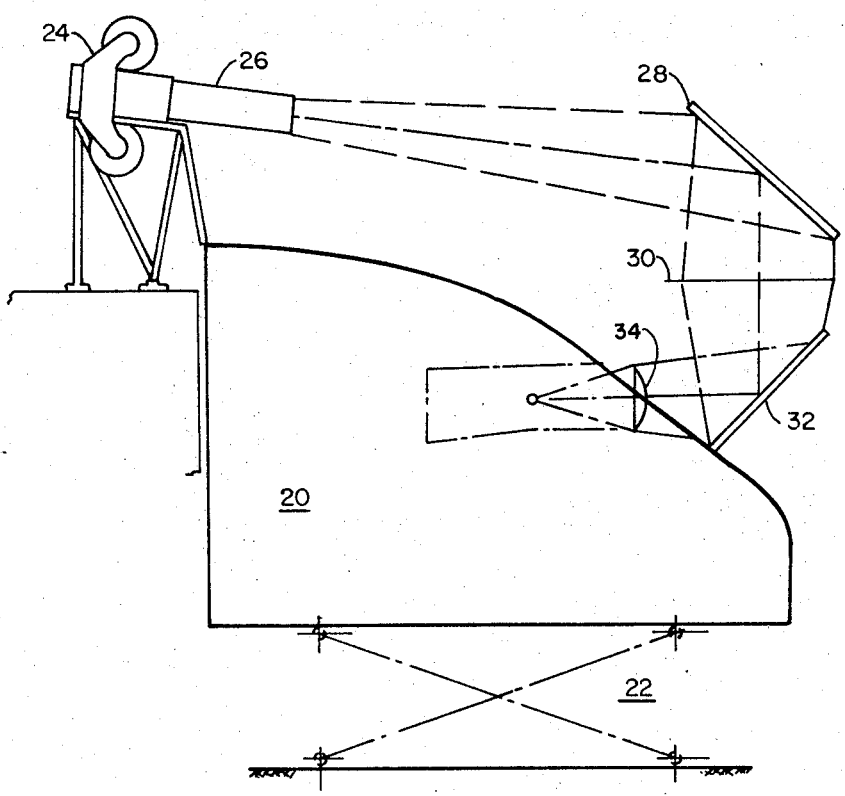
FIG. 2 is a side elevational and a diagrammatic view of a simulator with the associated visual system mounted thereon.

Such an aircraft simulator is illustrated in FIG. 2 as including a cockpit 20 which is mounted on a motion system generally designated with the reference numeral 22. A projector 24 displays the scenes recorded on the film which were photographed from the airplane 14 following the flight path 12. An optical system 26 provides the necessary alteration in the apparent perspective of the image in accordance with controls operated by the student pilot from within the cockpit 20. The projected image is displayed to the student pilot by means of a mirror 28, a rear projection screen 30, a mirror 32, and a lens 34.

The optical system 26 for altering the apparent perspective of the image of the scenes recorded on the film is illustrated in FIG. 3. As shown therein, the optical system 26 includes a first group of optical elements or lenses designated with the reference numeral 36 which form an image rotator and zoom lens combination. A group of lenses designated with the reference numeral 38 form a variable magnification, variable focal length or zoom lens combination for varying the size of the projected image. A Pechan prism 40 is disposed in front of the zoom lens 38 and permits rotation of the image. A fine focus for the system is provided by a group of lenses 42.

Immediately following the first section 36 is a group of lenses 44 which form an anamorphic lens group. Each of the lenses within the group 44 are fixed relative to one another and the entire group is mounted for rotation about the optical axis thereof. Another anamorphic group of lenses 46 are mounted for rotation on the optical axis of the optical system 26 in tandem with the lenses 44. A pair of pitch wedges 48 and 50 are disposed adjacent to the anamorphic group of lenses 46 and on the optical axis of the optical system 26 and produce a vertical shifting of the image passing therethrough. A decollimating lens group 52 forms the final group of lenses in the optical system 26.

If it is desired to project an image through the optical system 26 without any distortion thereto, the magnification axes of the anamorphic lenses 44 and 46 are disposed orthogonally to one another. If a one-to-one magnification is desired, the zoom lens 38 is conditioned to provide a reduction in the size of the image equal to the amount of enlargement produced by the two anamorphic lenses 44 and 46 on the image. In order to produce various effects of motion or changes in viewpoint, various elements of the optical system 26 are either translated or rotated accordingly.

In order to provide the effect of a simulated change in heading, the projector 24 is translated laterally as indicated by the double headed arrow designated with the reference numeral 54. To provide the effect of a simulated change in the pitch of the aircraft, the pitch wedges 48 and 50 are rotated in opposite direction with respect to one another to shift the entire image vertically. To provide the effect of roll, the image rotator Pechan prism 40 is rotated.

To provide the visual effect of movement along a flight path within the envelope 18 without any horizontal or vertical excursion, the magnification of the image is altered by means of the zoom lens 38. However, since the aircraft simulator 20 will have a simulated airspeed of approximately the airspeed of the camera airplane 14, any slight change required of the image due to a simulated change in the speed can be produced by controlling the speed of the film through the projector 24. In order to provide the visual effect of horizontal, vertical, or a combination of horizontal and vertical excursion within the envelop 18, the anamorphic lenses 44 and 46 must be rotationally positioned in accordance with a predetermined relationship. In addition, because of a rotation of the image produced by the anamorphic lenses 44 and 46, the Pechan prism 40 must be rotated to maintain all horizontal lines in the image parallel to the horizon. Since the total magnification produced by the anamorphic lenses 44 and 46 changes with the changes in position of those lenses, the zoom lens 38 must be conditioned to compensate for that change in magnification.

Figure 4:
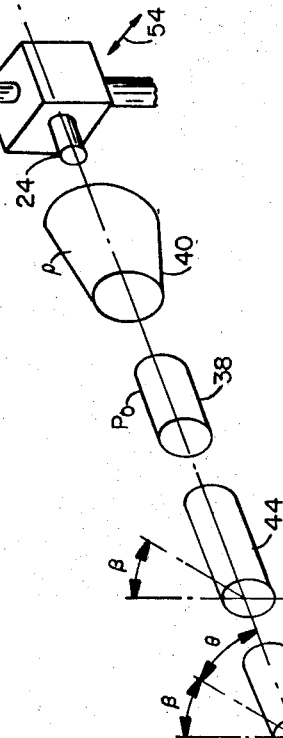
FIG. 4 is a diagrammatic illustration of the optical system illustrated in FIG. 3 showing the various functions and relationships of the elements therein.

Accordingly, the optical system illustrated in FIGS. 3 and 4 alters the apparent perspective of an image by the steps of providing two primitive transformations by means of the two anamorphic lenses, one spherical magnification by means of the zoom lens, and rotation of the image by means of the Pechan prism 40. The position of the anamorphic lens 44 is defined by the value of the angle $\beta$, which is the angle between the magnification axis of the anamorphic lens and a vertical line. The position of the anamorphic lens 46 is defined by an angle $\theta$, which is the angle between the magnification axis of the anamorphic lens 46 and the magnification axis of the lens 44.

Figure 5:
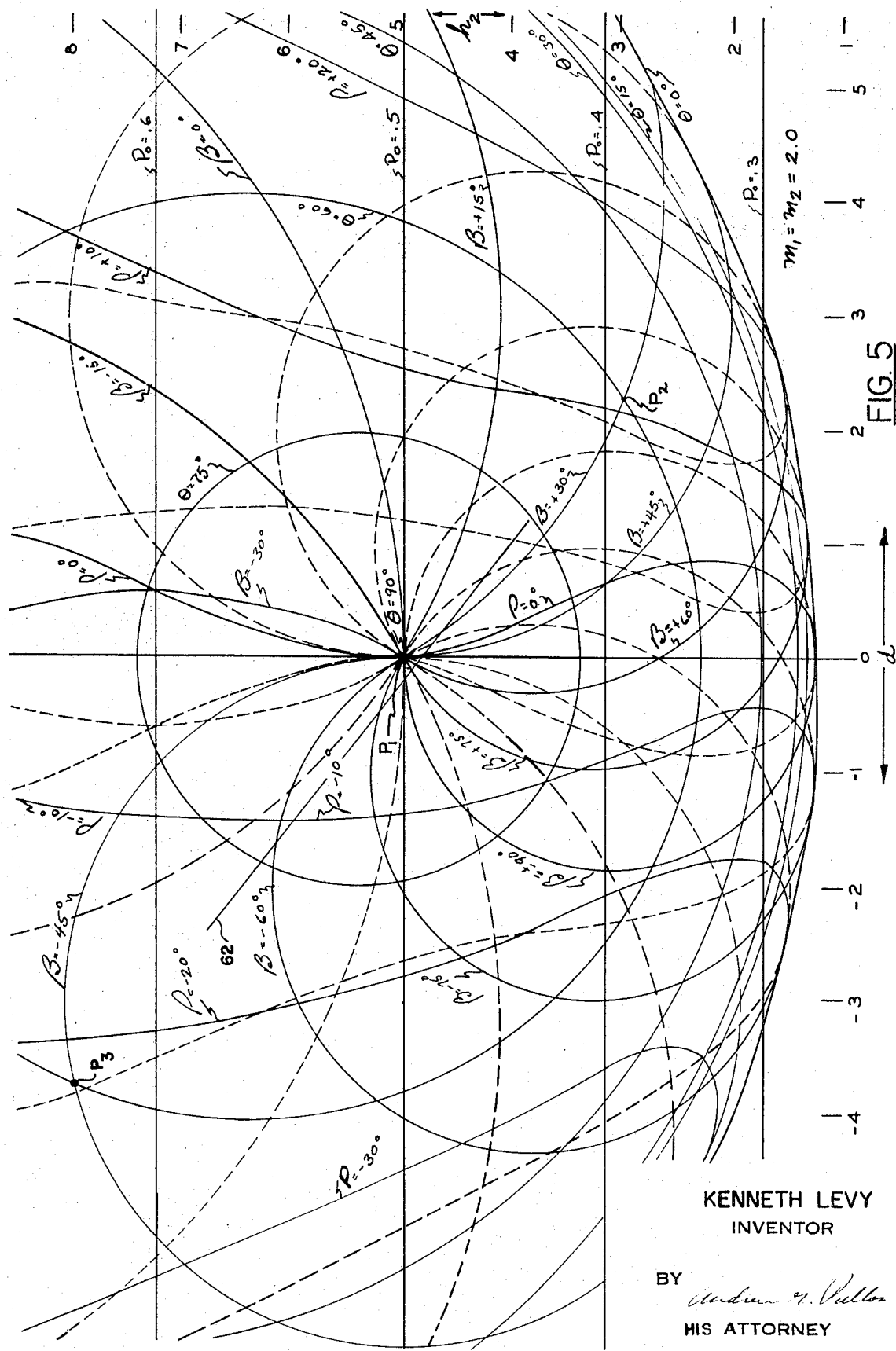
FIG. 5 is a graph of the positional relationship of several of the elements of the optical system illustrated in FIG. 3 with respect to the simulated viewpoint of an image projected by the optical system.

FIG. 5 is a graphical illustration of the values of $\beta$ and $\theta$ which will provide the change in the apparent perspective of an image transmitted through the optical system 26 illustrated in FIGS. 3 and 4. The families of curves shown in FIG. 5 are bounded by an envelope which is defined by the value $\theta$ equal to 0°. This envelope corresponds approximately to the envelope 18 illustrated in FIG. 1, which is the maximum possible excursion offered by the visual system in the alteration of the apparent perspective of an image. In FIG. 5, the abscissa represents a lateral displacement and the ordinate represents vertical displacement, each measured in the plane of the original viewpoint. The Point $P_1$ represents the viewpoint of the undistorted image of the scenes taken from the camera airplane 14. In addition to the values of $\beta$ and $\theta$, FIG. 5 illustrates the family of curves of the rotation $\rho$ of the Pechan prism 40. The magnifications $m_1$ of the anamorphic lens 44 and $m_2$ of the anamorphic lens 46 are indicated in FIG. 5 as being equal to the value 2.

Assume that an image of an area represents a scene as viewed from an original viewpoint located at an altitude of 5 units at a particular point, and that it is desired to provide an image of the area such as would be seen from a desired viewpoint at an altitude of approximately 3 units and laterally displaced from the initial viewpoint; or as shown in FIG. 5, that it is desired to alter an image taken at point $P_1$ to be in true perspective as viewed from a point $P_2$. FIG. 5 shows that the $\beta$ anamorphic lens 44 should be adjusted to a $\beta$ angle of +30°, the $\theta$ anamorphic lens 46 should be adjusted to a $\theta$ angle of 60°, the spherical magnification $p_0$ of the zoom lens 38 should be approximately 0.395, and that a counter rotation angle $\rho$ of the Pechan prism 40 should be approximately 10.5°. In the graph illustrated in FIG. 5, the $\beta$ family of curves represent the positions of the $\beta$ lens 44 with respect to a vertical line. However, if a rotation of the image is effected by the Pechan prism 40 prior to the transmittal of the image through the anamorphic lenses 44 and 46, the angle $\beta$ must be measured from a line which is displaced an angle $\rho$ from a vertical line. In other words, the values of the various angles and magnifications of the curves shown in FIG. 5 are true only for the situation in which the image rotator processes the image after it is processed or altered by the anamorphic lenses 44 and 46.

In considering a typical transformation of an image which would be required to simulate a visual change in perspective from the point $p_1$ to the point $p_2$ in the FIG. 5, four types of transformation are required, although it should be understood that the transformations are performed collectively.

Figure 6C:
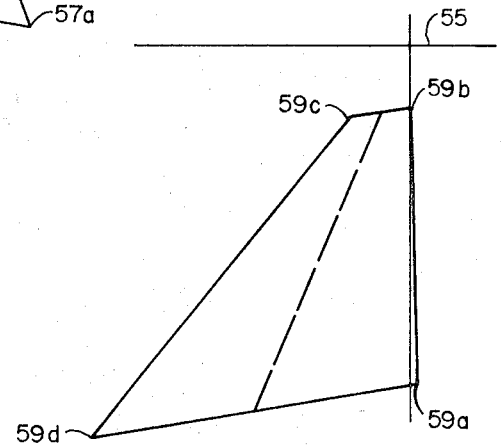
Figure 6D:
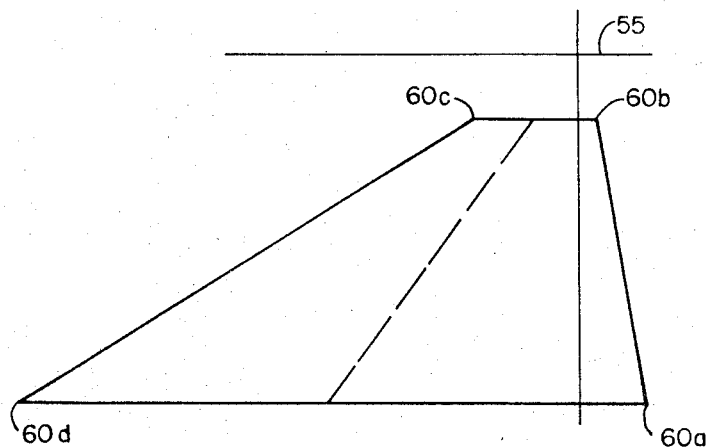

In order to understand the effect of each of the transformations on an image, a typical scene is illustrated in FIG. 6a with a first transformation of the image of that scene; a second transformation of that scene is illustrated in FIG. 6b; a third transformation is illustrated in 6c and the fourth and final transformation is illustrated in 6d in an apparent change in the visual viewpoint from the point $P_1$ to the point $P_2$. In FIG. 6a, the image of a typical scene of a landing strip is illustrated in conjunction with a horizon line 55. The image of the original scene of a landing strip is defined by the lines joining the points 56a—d. The Pechan prism 40 rotates the original image to an angle of 10.5° which results in an image of the landing strip having an outline defined by the lines joining the points 57a—d. Following rotation of the image by the Pechan prism 40, the image is reduced in size by the zoom lens 38 as shown in FIG. 6b by the transformed image of the landing strip defined by the lines joining the points 58a—d. The rotated and reduced image is next transformed by the $\beta$ anamorphic lens 44 to produce the image illustrated in FIG. 6c and defined by the outline formed by the lines joining the points 59a—d. Thereafter, the image is further transformed by the $\theta$ anamorphic lens 46 to produce the image defined by the outline formed by the lines joining the points 60a—d illustrated in FIG. 6d. It should be understood, of course, that the image presented to the student pilot will be that illustrated in FIG. 6d and that any simulated motion of the aircraft simulator 20 will cause the optical system 26 to gradually distort the image as an excursion is made from one point to another point within the envelope 18.

Although the change in perspective of an image may be gradual, such changes may require high accelerations of the $\beta$ lens 44. For example, if the controls of the aircraft simulator 20 are operated in the manner to simulate a change within the envelope 18 from the point $P_2$ to a point $P_3$, the most direct excursion between those two points will follow a line on the graph in FIG. 5 which passes through or very near the point $P_1$. A segment of such a line is illustrated in FIG. 5 and designated with the reference numeral 62. During a simulated excursion along the line 62, the $\beta$ lens 44 must attain extremely high accelerations from a rotational position which is less than +30° to a rotational position which is equal to −45°. It can readily be appreciated that if an excursion is made thorough the point $P_1$, extremely high accelerations will be necessary in order to accurately position the $\beta$ lens 44. Since the position of the $\theta$ lens 46 is defined with respect to the position of the $\beta$ lens 44, at or near the point $P_1$, the $\theta$ lens 46 remains substantially fixed with respect to the $\beta$ lens, but the $\theta$ lens 46 must also attain the same or substantially the same acceleration as that required of the $\beta$ lens 44. At the point $P_1$, the position of the $\beta$ lens is undefined with respect to a reference, such as a vertical line. Consequently, the quantities which are computed from the controls of the simulator 20 to drive the $\beta$ lens 44 will be undefined at the point $P_1$ and a discontinuity will exist in such computations. As a result, extremely high accelerations may be encountered in the positioning of the $\beta$ lens at or near the point $P_1$. However, these accelerations of the $\beta$ lens do not present any difficulties if the same accelerations can be achieved in the $\theta$ lens 46 in order to maintain the position of the $\theta$ lens fixed with respect to the $\beta$ lens at the point $P_1$.

The computed quantities for driving the $\theta$ lens at or near the point $P_1$ will be equal to or substantially equal to zero, since the position of the $\theta$ lens with respect to the $\beta$ lens or near the point $P_1$ remains substantially fixed. Consequently, movement of the $\beta$ lens 44 is required before a signal can be developed to drive the $\theta$ lens in accordance with the motion of the $\beta$ lens.

A portion of a system for computing the quantities which are required for positioning the elements of the optical system 26 is illustrated in FIG. 7. As shown therein, signals which are indicative of forces applied to the aircraft simulator 20 are supplied from the controls 64 thereof to a flight computer 66 which continually computes the simulated position along three orthogonal coordinate axes of the aircraft 20. The signals from the flight computer 66 are supplied to an attitude computer 68 which also receives signals from a film readout 70, which signals are indicative of the position of the scene recorded on the film. The attitude computer 68 computes the quantities $d$ and $h$ (which are plotted on the abscissa and on the ordinate respectively of the graph illustrated in FIG. 5) and supplies such computed quantities to an optical transformation computer 72 which derives the quantities for positioning the elements of the optical system 26. If the computed quantity $d$ is equal to zero and the computed quantity $h$ is equal to 5 in terms of the values illustrated in the graph of FIG. 5, the computed quantity representative of the position of the $\beta$ lens will be undefined. Consequently, the optical transformation computer 72 will attempt to continually compute the $\beta$ quantity from the values of $d$ and $h$ which may result in rapidly changing signals being supplied to the $\beta$ drive system which will result in high accelerations of the $\beta$ lens 44. However, at the point $P_1$, the optical transformation computer 72 will compute the quantity $d\theta/dt$ as being equal to zero, since no change in position is required of the $\theta$ lens 46 at the point $P_1$.

FIG. 8 is a view in elevation of an apparatus for driving the $\beta$ and $\theta$ lenses such that rotation of the $\beta$ lens 44 will produce an equal rotation in the position of the $\theta$ lens 46 to maintain a defined positional relationship of the $\theta$ lens 46 with respect to the $\beta$ lens 44. As shown therein, the group of lens elements which form the $\beta$ anamorphic lens 44 are mounted within a cylindrical housing 74 which is journaled for rotation about an axis 76 of the optical system 26. The group of lens elements which form the $\theta$ anamorphic lens 46 are mounted within a cylindrical housing 78 which is also journaled for rotation about the optical axis 76. A gear 80 is secured to one end of the housing 74 and a gear 82 is secured to one end of the housing 78, such that rotation of the gears 80, 82 causes a rotation of the magnification axes of the anamorphic lenses 44 and 46.

A servomotor 84 having a gear 86 connected to an output shaft thereof is disposed for positioning the housing 74 of the $\beta$ lens. In particular, the gear 86 engages a gear 88 which forms one input of a differential coupling 90 and is journaled for rotation on a shaft 92. The gear 88 is secured to a bevel gear 94 of the differential coupling and engages the gear 80 mounted on the housing 74. Another servomotor 96 having a gear 98 secured to an output shaft thereof is disposed for positioning the housing 78 of the $\theta$ lens with respect to the rotational position of the housing 74. In particular, the gear 98 engages a gear 100 which is journaled on the shaft 92 and forms a second input of the differential coupling 90 by virtue of its being secured to a bevel gear 102 thereof. A gear 104 is secured to the shaft 92 of the differential coupling 90 and forms an output thereof. The gear 104 engages the gear 82 on the housing 78 of the $\theta$ lens. By the described arrangement, rotation of the servomotor 84 rotates each of the housings 74 and 78 an equal amount and rotation of the servomotor 96 alters the position of the $\theta$ lens with respect to the $\beta$ lens.

If the magnification axis of the $\theta$ lens is to remain fixed with respect to the magnification axis of the $\beta$ lens, the gear 100 which forms the second input of the differential coupling 90 is held stationary by the $\theta$ servomotor 96. Under such conditions, any rotation of the gear 88 which forms the first input of the differential coupling 90 will rotate both housings 74 and 78 through equal angles. However, if a torque is supplied to the gear 88, a portion of that torque will be transmitted, not only to the output of the differential coupling 90 in the form of the gear 104, but also to the gear 100. If the $\theta$ lens is to remain fixed in its position with respect to the position of the $\beta$ lens, the servomotor 96 will be stationary and any rotation of the gear 100 will be realized as an error at the output of the servomotor 96. If the servomotor 96 forms part of a servomechanism, a feedback signal will be developed which is proportional to that error. However, since the gain of the feedback loop of the servomechanism cannot be infinite, the feedback signal within the servomechanism will not be adequate to develop sufficient torque by the servomotor 96 to compensate for all of the error at the output thereof.

This disparity between the actual position and the desired position of the output of the servomotor 96 is illustrated graphically by the graph of FIG. 9. As shown therein, the abscissa represents the disparity or error between the actual position and the desired position at the output of a servomechanism and the ordinate represents the torque which is developed by the servomotor 96 in response to the error at the output of the servomechanism. If the gain of the feedback loop is increased, the slope of the line designated G will increase, resulting in less error between the actual and the desired position of the servomechanism output with the same amount of torque developed by the servomotor. However, the gain of the feedback loop in a servomechanism cannot exceed a predetermined upper limit without causing an unstable condition in the servomechanism.

As a result of the disparity between the actual and the desired position at the output of a servomechanism, when it is desired to maintain the position of the magnification axis of the $\theta$ lens fixed with respect to the position of the magnification axis of the $\beta$ lens, and when it is further desired to rotate the magnification axis of the $\beta$ lens, an error will result due to the inherent compliance of the servomechanism. This condition exists at the positions of the $\beta$ and $\theta$ lenses corresponding to the point $P_1$ in the graph illustrated in FIG. 5.

In the magnification axis of the $\theta$ lens is not to move with respect to the magnification axis of the $\beta$ lens, while the $\beta$ lens is being accelerated, a torque must be developed by the servomotor 96 before any error occurs in the output thereof. If the torque required at the output of the servomotor 96 is known, this torque can be introduced into the input of the differential coupling 90 before an error occurs therein due to the acceleration of the $\beta$ lens produced by the servomotor 84.

With the magnification axis of the $\theta$ lens fixed with respect to the magnification axis of the $\beta$ lens, the acceleration of the $\theta$ lens, $a_\theta$, is equal to the acceleration of the $\beta$ lens, $a_\beta$. As a result, the following expressions define the dynamics of the apparatus illustrated in FIG. 8:

$$a_\beta = a_\theta \quad (1)$$

$$T_\beta - a_\beta J_\beta - T_\theta = 0 \quad (2)$$

Where $T_\beta$ is the torque developed by the servo motor 84, $J_\beta$ is the inertia of the $\beta$ lens, and $T_\theta$ is the torque developed by the servo motor 96.

Also:

$$T_\theta - a_\beta J_\theta = 0 \quad (3)$$

Where $J_\theta$ is the inertia of the $\theta$ lens.
From expression (3):

$$a_\beta = \frac{T_\theta}{J_\theta} \quad (4)$$

and by substitution of expression (4) into expression (2):

$$T_\beta - \frac{T_\theta J_\beta}{J_\theta} - T_\theta = 0 \quad (5)$$

or $$T_\beta = T_\theta \left[ \frac{J_\beta + J_\theta}{J_\theta} \right] \quad (6)$$

Therefore:

$$\frac{T_\theta}{T_\beta} = \frac{J_\theta}{J_\beta + J_\theta} \quad (7)$$

From the above derivations, it can readily be appreciated that $T_\theta$ is proportional to $T_\beta$. If the magnification axis of the $\theta$ lens is to remain fixed with respect to the magnification axis of the $\beta$ lens, then in order for $T_\theta$ to be developed at an output of the servomotor 96, an error must occur in the position of the output shaft thereof, which error is proportional to $T_\theta$; hence it is proportional to $a_\beta$.

The present invention contemplates eliminating this error by developing the torque $T_\theta$ by sensing the acceleration of the $\beta$ lens, $a_\beta$, which is proportional to $T_\beta$. Since $a_\beta$ is proportional to $T_\beta$, the present invention senses the torque $T_\beta$, and develops a signal proportional thereto which is supplied to the servomotor 96 to develop a torque therein to eliminate the error developed in the system.

A schematic diagram of a circuit for eliminating the error and which is constructed in accordance with the principals of the present invention is illustrated in FIG. 10 of the drawings. As shown therein, one input of the differential coupling 90 is connected to a servomechanism generally designated with the reference numeral 106 and the other input thereof is connected to a servomechanism generally designated with the reference numeral 108. An output shaft of the servomotor 96 which forms an output of the servomechanism 106, is connected to one input of the differential coupling 90. The output shaft of the servomotor 84, which forms the output of the servomechanism 108, is connected to the other input of the differential coupling 90.

A computed quantity commensurate with the desired position of the $\theta$ lens housing 78 is applied to an input terminal 110 of the servomechanism 106. Another computed quantity commensurate with the position of the $\beta$ lens housing 74 is applied to input terminals 112 and 114 of the servomechanism 108.

The signal supplied to the terminal 110 is connected to one input of an amplifier 116 through a resistor 118. An output of the amplifier 116 is connected to the servomotor 96 to position the output shaft thereof in accordance with the signals applied at the inputs thereof. A first feedback of the servomechanism 106 is formed by a potentiometer 120 connected between a source of voltage and ground potential and having the movable contact arm thereof ganged to the output shaft of the servomotor 96. The movable contact arm of the potentiometer 120 is connected through a resistor 122 to another input of the amplifier 116. When the amplitude of the signal applied to the terminal 110 is equal to the amplitude of the voltage developed on the movable contact arm of the potentiometer 120, the output of the amplifier 116 is zero. Therefore, if a signal is applied to the input terminal 110 which is of different amplitude than the voltage on the movable contact arm of the potentiometer 120, the output of the amplifier 116 will be other than zero. Accordingly, the servomotor 96 will be driven to alter the rotational position of the output shaft thereof and the position of the movable contact arm of the potentiometer 120 until a point is reached at which the voltage on the movable contact arm of the potentiometer 120 is equal in amplitude to the amplitude of the signal applied to the terminal 110. The output shaft of the servomotor 96 is also ganged to a tachometer-generator 124 which develops a signal proportional to the velocity of the output shaft and supplies such signal through a pair of resistors 126 and 128 to another input of the amplifier 116.

A synchro 130 includes a Y-connected stator 132 and a single winding rotor 134, which rotor is mechanically connected to an output shaft of the motor 84. The input terminals 112 and 114 are connected to respective windings of the stator having the third winding thereof connected to ground potential. The two inputs of a phase sensitive demodulator 136 are connected to respective ends of the rotor 134. An output of the phase sensitive demodulator 136 is connected through a resistor 138 to one input of an amplifier 140. The output of the amplifier 140 is connected through a resistor 142 to the servomotor 84.

A feedback loop is provided by means of the synchro rotor 134 connected to the phase sensitive demodulator 136 which is in turn connected through a resistor 138 to an input of the amplifier 140. A tachometer 148 is driven from the output shaft of the servomotor 84 and is connected through a resistor 150 to another input of the amplifier 140.

The voltage developed across the resistor 142 is proportional to the current passing therethrough which is, in turn, proportional to the torque developed by the servomotor 84. A differential amplifier 152 is connected in parallel with the resistor 142 and develops a signal at an output thereof which is proportional to the torque developed by the servomotor 84. The output of the amplifier 152 is connected through a resistor 154 to another input of the amplifier 116, thereby supplying a signal to the servomechanism 106 to compensate for the error therein resulting from the compliance thereof.

From expression (7) hereinabove, it can be appreciated that if the $\theta$ lens is not to move with respect to the $\beta$ lens while the $\beta$ lens is being accelerated, the torque developed by the motor 96 is proportional to the torque developed by the motor 84. As previously mentioned, in order for the servomotor 96 to develop a torque, an error must occur at the output shaft thereof which will be sensed by the movable contact arm on the potentiometer 120. This error is proportional to the torque developed by the servomotor 96 as illustrated by the graph in FIG. 9; hence the error is proportional to the acceleration $a_\beta$. Since the system is subject to relatively high accelerations, relatively large errors will result which are eliminated by the teachings of the present invention. If the torque required at the output of the servomotor 96 is known, such a torque can be developed before the error occurs in the servomechanism 106. Since the error is proportional to the acceleration $a_\beta$ which is proportional to the torque developed by the servomotor 84, which torque is proportional to the current through the servomotor 84, a signal can be developed and supplied to the servomechanism 106 as a feed-forward torque compensation signal to eliminate the error before it occurs.

In a normal permanent magnet, DC motor the torque generated is directly proportional to the current in the windings. Therefore, if a current is supplied to the servomotor 96 which is proportional to the torque developed by the servomotor 84, the error resulting from the compliance of the servomechanism 106 is eliminated. As previously described, this condition which results in an error is particularly pronounced when the velocity of the output shaft of the servomotor 96 is equal to zero. Under such conditions, there is no back EMF in the servomotor 96, and consequently, the current in the motor 96 is proportional to the voltage developed thereon.

The principles of the present invention explain in connection with the specific exemplification thereof as described hereinabove and illustrated in the accompanying drawings will suggest many other applications and modifications of the same. It is accordingly desired that, in construing the breadth of the appended claims, they shall not be limited to the specific details shown and described in connection with the disclosed exemplification of the present invention.

I claim:

1. A system for displacing a pair of positionally related elements in accordance with two variables, said system comprising, in combination:
   a. first and second torque developing means, each responsive to a respective one of said variables;
   b. a differential coupling having inputs from each of said torque developing means;
   c. first coupling means between one of said elements and one of said torque developing means, whereby the former is positioned as a direct function of the output of the latter;
   d. second coupling means between the other of said elements and the output of said differential coupling, whereby the former is positioned as a function of both of said inputs to the latter;
   e. means for measuring the torque developed by the torque developing means developing the greater torque; and
   f. means for adding a component proportional to said measured torque to the variable to which the other of the torque developing means is responsive, thereby reducing the positional error of said other element resulting from transmission of torque through said differential coupling from the input having the greater torque to the input having the lesser torque.

2. The invention according to claim 1 wherein said torque developing means are servomechanisms and their respective servomotors.

3. The invention according to claim 2 wherein said means for measuring the torque comprise means for sensing the current in the servomotor developing the greater torque.

4. The invention according to claim 3 wherein one of said servomechanisms includes a synchro-resolver having as an input one of said variables, and a phase sensitive demodulator connected to an output of said synchro-resolver and having an output connected as an input to the respective servomotor.

5. The invention according to claim 4 wherein said synchro-resolver includes a rotor connected to the output of said servomotor and a stator inductively coupled to said rotor.